United States Patent
Baruch et al.

(10) Patent No.: US 10,445,191 B1
(45) Date of Patent: Oct. 15, 2019

(54) INTEGRATION OF RESTORE SERVICE WITH DATA PROTECTION SYSTEM

(71) Applicant: EMC IP Holding Company LLC, Hopkinton, MA (US)

(72) Inventors: Leehod Baruch, Rishon Leziyon (IL); Assaf Natanzon, Tel Aviv (IL); Saar Cohen, Moshav Mishmeret (IL); Jehuda Shemer, Kfar Saba (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 303 days.

(21) Appl. No.: 15/394,988

(22) Filed: Dec. 30, 2016

(51) Int. Cl.
| | | |
|---|---|---|
| *G06F 16/00* | (2019.01) | |
| *G06F 11/14* | (2006.01) | |
| *G06F 16/27* | (2019.01) | |
| *G06F 16/11* | (2019.01) | |

(52) U.S. Cl.
CPC ...... *G06F 11/1469* (2013.01); *G06F 11/1451* (2013.01); *G06F 16/128* (2019.01); *G06F 16/27* (2019.01); *G06F 11/1464* (2013.01); *G06F 2201/80* (2013.01); *G06F 2201/84* (2013.01)

(58) Field of Classification Search
CPC combination set(s) only.
See application file for complete search history.

(56) References Cited

U.S. PATENT DOCUMENTS

| | | | | |
|---|---|---|---|---|
| 6,269,431 B1 * | 7/2001 | Dunham | ............ | G06F 11/1469 707/999.202 |
| 7,231,544 B2 * | 6/2007 | Tan | .................... | G06F 11/1446 714/15 |
| 7,596,713 B2 * | 9/2009 | Mani-Meitav | ...... | G06F 11/1456 707/999.2 |
| 7,899,788 B2 * | 3/2011 | Chandhok | ........... | G06F 11/1458 707/640 |
| 8,417,905 B2 * | 4/2013 | Linde | .................. | G06F 11/1466 707/649 |
| 2012/0078856 A1 * | 3/2012 | Linde | .................. | G06F 11/1466 707/679 |
| 2013/0103649 A9 * | 4/2013 | Linde | .................. | G06F 11/1466 707/679 |

* cited by examiner

*Primary Examiner* — Farhan M Syed
(74) *Attorney, Agent, or Firm* — Ryan, Mason & Lewis, LLP (57) ABSTRACT

Improved restore services in data storage environments are provided. In one example, a method includes the following steps. Generation of a point-in-time copy of a set of files associated with a data storage system is requested. The point-in-time copy is useable for restoring data blocks of the set of files onto the data storage system. The point-in-time copy of the set of files is generated at a data protection system operatively coupled to the data storage system in response to the requesting step. The point-in-time copy of the set of files is stored at the data protection system.

20 Claims, 6 Drawing Sheets

INTEGRATION OF RESTORE SERVICE WITH DATA PROTECTION SYSTEM

FIELD

The field relates generally to data storage environments, and more particularly to techniques for providing restore services in such data storage environments.

BACKGROUND

Some operating systems installed on computing systems implement a feature generally referred to as a restore service. One example is the restore point feature available in Windows® operating systems. For example, the restore point feature enables creation of a restore point for the operating system (OS) whenever an application is installed or when an OS update is installed since these events might be disruptive and the user might want to undo them. In addition to an event-driven restore point, creation of restore points can be periodically scheduled. The restore point is essentially a copy of certain OS files (e.g., registry files, program files, driver files, or other configuration files) that exist just prior to the system change (e.g., application installation or version update, OS version update, etc.) that enables the system to effectively return to a state that existed just prior to the system change by reloading the OS files that are associated with the restore point. When a restore point is selected by a user, the user is typically notified which of the files (e.g., programs, drivers, etc.) will be affected if the restore point is activated. Further, when the computing system is restored to a state at a previous point in time by activating a given restore point, only the OS files are restored while the data files of the user are not. Still further, when the computing system that generated the restore points is protected by a backup or replication system, the restore points themselves are also replicated or backed up.

SUMMARY

Embodiments of the disclosure provide improved restore services in data storage environments.

For example, in one embodiment, a method comprises the following steps. Generation of a point-in-time copy of a set of files associated with a data storage system is requested. The point-in-time copy is useable for restoring data blocks of the set of files onto the data storage system. The point-in-time copy of the set of files is generated at a data protection system operatively coupled to the data storage system in response to the requesting step. The point-in-time copy of the set of files is stored at the data protection system.

These and other illustrative embodiments include, without limitation, methods, apparatus, systems, and computer program products comprising processor-readable storage media.

DETAILED DESCRIPTION

Illustrative embodiments of the disclosure will be described herein with reference to exemplary data storage environments, data protection systems, and associated production and replica sites, data backup systems, processing platforms and processing devices. It is to be appreciated, however, that embodiments are not restricted to use with the particular illustrative system and device configurations shown. Moreover, the term "data storage environment" as used herein is intended to be broadly construed, so as to encompass, for example, multi-site data centers, private or public cloud computing systems, grid computing systems, computing clusters, high performance computer systems or storage systems, as well as other types of systems comprising distributed information technology infrastructure.

Data protection such as replication typically protects a primary data storage system (often called a production system or production site) by replicating the primary data storage system on a secondary data storage system (often called a data protection system, a replica system or replica site). The production site and the replica site are typically coupled by a communications network such as a wide area network (WAN).

A restore service such as the above-mentioned restore point feature may be used in conjunction with data storage systems that include data protection systems such as replication or backup. However, restore points typically use storage capacity. For example, in certain Windows® OS versions, storage capacity for restore points consumes about 3-5% of the disk space at the production site. Conventionally the storage capacity of the disk is the limiting factor for the restore point retention as new restore points delete old ones if there is not enough storage capacity. Generally, when the disk is block protected by a backup or replication system, i.e., a block protection system, the restore points are also replicated as part of the disk. Thus, in conventional systems if there is a problem, the user may choose to either restore the OS to an older state from the OS restore points or restore the entire device using the block protection system. While both options are important to users, it is realized in accordance with exemplary embodiments that there is a waste of storage capacity and inefficiency for at least two reasons:

(1) The block protection system backs up the restore points which is redundant because the previous state of the OS is already present in older restore points of the disk.

(2) The retention of the OS restore points is limited by the size of the production disk even though there is typically more storage capacity dedicated for backup in the block protection system.

To address these and other drawbacks, illustrative embodiments integrate the OS restore capabilities with the data protection system by making the data protection system aware of the OS events and the file system structure. In accordance with illustrative embodiments of such operating system-protection system integrated restore service functionality, whenever an OS point of restoration needs to be created, the data protection system creates a point-in-time copy of the relevant files, and also maintains relevant metadata for the particular point in time. In this manner, in some embodiments the user could choose to restore only the OS files from the data protection system without affecting the rest of the file system, or could choose to restore the OS files and the data files. As such, in accordance with illustrative embodiments, there is no need to store these point-in-time copies on the production disk since they are now generated and stored on the data protection system. In many embodiments, this technique frees up a significant amount of storage capacity on the production system.

In some illustrative embodiments, a point-in-time copy of files may be in the form of a snapshot, an image, a bookmark, etc. However, in illustrative embodiments with continuous replication that includes journaling, the point-in-time copies may be stored in streams and not necessarily in snapshots.

In order to enable restoration of OS files from the replica site, in certain embodiments, the data protection system may be made aware of the file system structure and the OS system files. In illustrative embodiments, this may be accomplished at least in part by implementing a file system filter at the operating system on the production site in order to capture requests for creating a point-in-time copy of the OS files. Therefore, upon a request to recover the entire OS to a specific point in time, in some embodiments, the data protection system may access the relevant point-in-time copy of files and restore only the relevant critical files of the OS, leaving the rest of the files in the file system unchanged. Further, in certain embodiments, upon a request to recover a specific file from a specific point-in-time copy, the data protection system may retrieve only this specific file from the relevant point in time.

In an additional illustrative embodiment, the file system filter may be configured to maintain a placeholder file that services input/output requests to this file by direct access to the data protection system. Such access is referred to herein with respect to the placeholder file as virtual access. That is, the restore can be done in a traditional way so that all files will be restored before the OS can access them. However, with virtual access, the files can be left as virtual (dummy or placeholder status) or gradually become non-virtual as the restore process continues in the background until the entire file is restored.

Advantageously, as will be further illustrated in many embodiments, the point-in-time copy of the files is stored on the data protection system (replica site) for subsequent restoration rather than being stored on the data storage system (production site). Thus, disk storage capacity on the production site is saved. Furthermore, since the data protection system will typically have greater storage capacity than the data storage system, more point-in-time copies of files can be stored for subsequent restoration in certain embodiments.

While "data blocks" are illustrated in the example embodiments of the figures and described herein as the data format upon which prioritized restoration is performed, it is to be understood that in other embodiments data in formats similar to blocks, e.g., sectors, clusters, etc., may be restored using techniques described herein. Furthermore, while the storage devices illustratively described herein as being part of the various data storage environments include block devices in some embodiments, in other embodiments storage devices that support formats similar to block storage may be used. In most embodiments, a "block device" may be a storage device that supports reading and writing data in fixed-size blocks. In certain embodiments, one or more such data blocks may be stored in storage volumes on the block devices. In some embodiments, one or more data blocks may be combined together to form a file. Thus, in certain embodiments, the data protection system may protect the block devices by replicating the data blocks of the data storage system.

Figure 1:
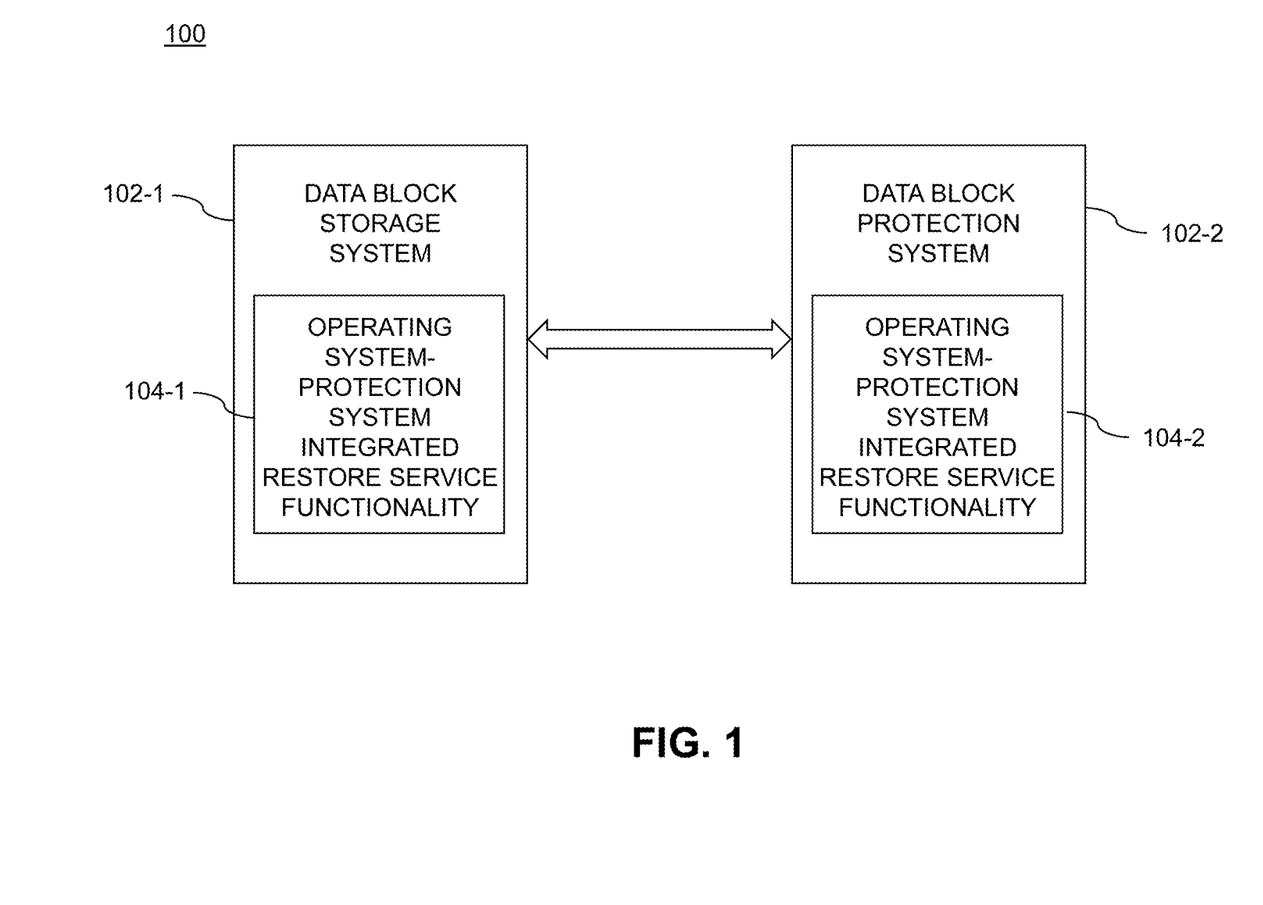
FIG. 1 illustrates a data storage environment with operating system-protection system integrated restore service functionality, according to an embodiment of the disclosure.

The example embodiment of FIG. 1 illustrates a data storage environment 100 with operating system-protection system integrated restore service functionality, according to an embodiment of the disclosure. As shown, the data storage environment 100 comprises a data block storage system 102-1 and a data block protection system 102-2. The data block protection system 102-2 provides replication and/or backup functions for the data block storage system 102-1. More particularly, data blocks stored on storage devices (e.g., block devices) of data block storage system 102-1 are replicated and/or backed up on storage devices (e.g., block devices) of data block protection system 102-2. Then, in response to a failure or data loss at the data block storage system 102-1, data block protection system 102-2 restores data blocks associated with files at the data block storage system 102-1 from replicated/backed-up data blocks stored on the data block protection system 102-2. Data block storage system 102-1 is an example implementation of a production site, while data block protection system 102-2 is an example implementation of a replica system.

The restore service is requested through the data block storage system 102-1 and performed in accordance with point-in-time copies of files (and their data blocks) that are generated and stored on the data block protection system 102-2. This is generally depicted in FIG. 1 with an operating system-protection system integrated restore service functionality 104-1 being implemented on data block storage system 102-1 and an operating system-protection system integrated restore service functionality 104-2 being implemented on data block protection system 102-2.

Accordingly, as will be further explained below, illustrative embodiments provide for generation and storage of point-in-time copies of files at the data block protection system 102-2 rather than at the data block storage system 102-1. In many embodiments, this functionality enables saving storage capacity at the data block storage system 102-1 and enables selective restoration of only OS files or OS files and data files.

In alternative illustrative embodiments, some subset of a set of point-in-time copies of files can be stored on the data block storage system 102-1, while remaining ones of the set of point-in-time copies of files are stored on the data block protection system 102-2. In such alternative illustrative embodiments, storage capacity may still be saved at the data block storage system 102-1 since not all point-in-time copies are stored thereon and therefore not every point-in-time copy is redundantly replicated.

Referring again to FIG. 1, data block protection system 102-2 can be part of a replication or back up system which can be remote from the data block storage system 102-1, local to the data block storage system 102-1, or some combination thereof. In some embodiments, data block protection system 102-2 is more particularly implemented utilizing a Data Domain® system from Dell EMC of Hopkinton, Mass. A Data Domain® system provides secondary storage optimized as a replica or backup target for data blocks of a primary storage system, and is therefore well suited for use as part of data block protection system 102-2.

Figure 2:
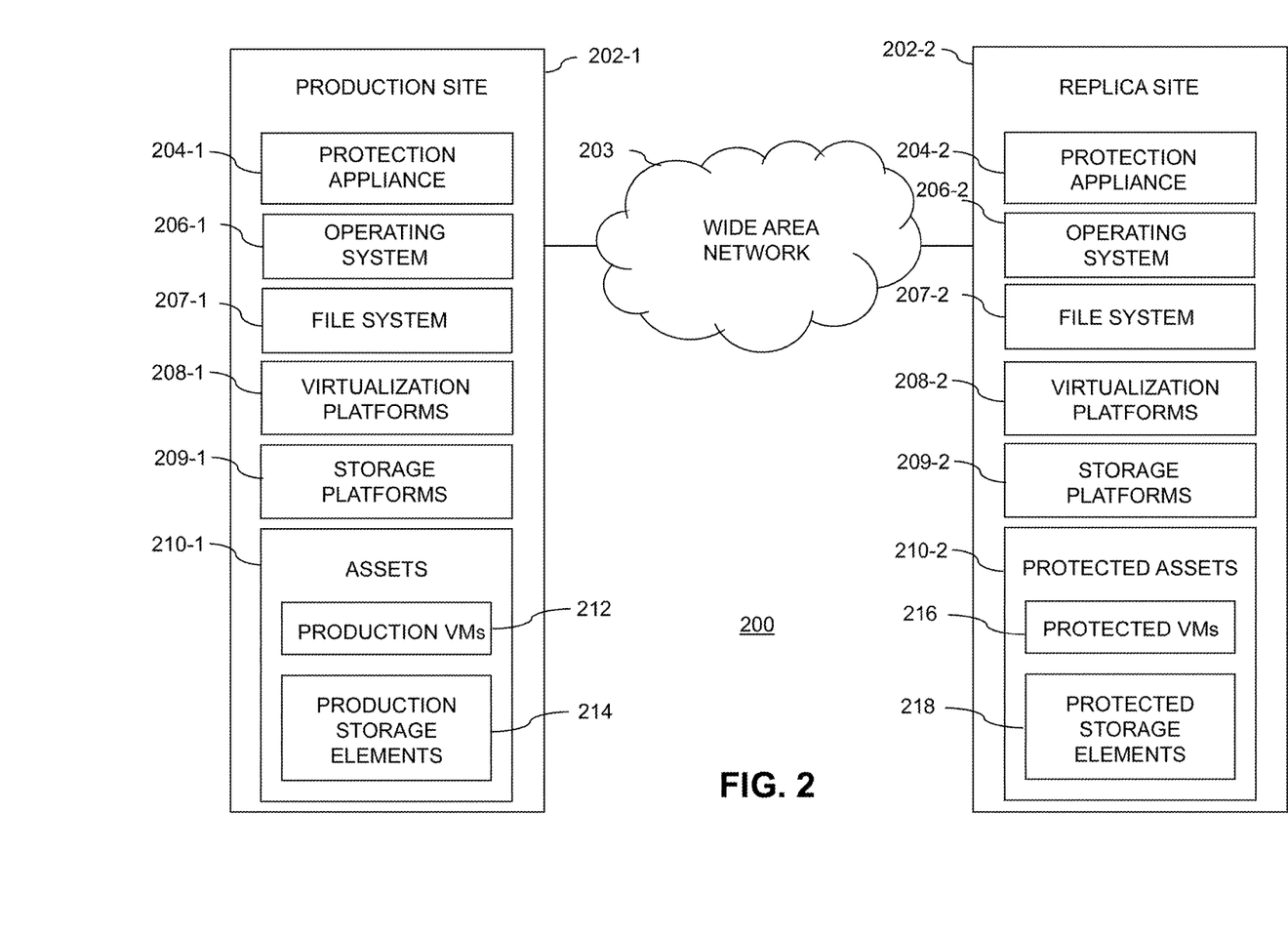
FIG. 2 illustrates a data storage environment comprising a replication system with which operating system-protection system integrated restore service functionality is implemented, according to an embodiment of the disclosure.

Turning now to the example embodiment of FIG. 2, a data storage environment 200 is illustrated comprising a replication system with which operating system-protection system integrated restore service functionality is implemented, according to an embodiment of the disclosure. Data storage environment 200 is an example implementation of data storage environment 100 of FIG. 1. More particularly, the data storage environment 200 in FIG. 2 comprises a production site 202-1 that communicates with a replica site 202-2 over a network 203. Production site 202-1 is an example implementation of data block storage system 102-1, while replica site 202-2 is an example implementation of data block protection system 102-2.

Referring back to the example embodiment of FIG. 2, the production and replica sites 202-1 and 202-2 are examples of what are more generally referred to herein as respective first and second sites of a data storage environment. Numerous other types and arrangements of multiple sites may be used in other embodiments, and such sites may be configured to implement similar functionality. For example, although site 202-1 is shown as a production site relative to replica site 202-2 in this embodiment, site 202-1 may additionally serve as a replica site relative to site 202-2 operating as a production site. In addition, a given one of the sites 202-1 or 202-2 may be configured to serve as a replica site for each of multiple production sites of a data storage environment.

The network 203 in the example embodiment of FIG. 2 may comprise, for example, a global computer network such as the Internet, a wide area network (WAN), a local area network (LAN), a software defined network (SDN), a satellite network, a telephone or cable network, a cellular network, a wireless network such as WiFi or WiMAX, a network comprising virtual network switches, or various portions or combinations of these and other types of networks.

It is assumed in this exemplary embodiment that site 202-2 replicates functions, processes, structures, modules and assets of site 202-1 for purposes of protecting site 202-1 from loss, corruption, and/or failure by providing redundancy. Thus, as is shown, site 202-2 comprises the same or similar functions, processes, structures, modules and assets as site 202-1, as will be further explained below. Since, in illustrative embodiments, data is processed as data blocks, the production site may include block devices and the replica site 202-2 may be referred to as a block device protection system.

In the example embodiment of FIG. 2, the sites 202-1 and 202-2 comprise respective protection appliances 204-1 and 204-2. It is understood that the protection appliance 204-1 operates in conjunction with protection appliance 204-2 to enable the replication of functions, processes, structures, modules and assets of site 202-1 on site 202-2. The protection appliances 204-1 and 204-1 may in other embodiments be implemented at least in part using an external controller, that is, a controller that is external to one or both of the sites 202-1 and 202-2.

Further, in the example embodiment of FIG. 2, the sites 202-1 and 202-2 comprise respective operating systems 206-1 and 206-2, as well as respective file systems 207-1 and 207-2. In illustrative embodiments, a "file system" may be a system that the operating system employs to store and access data within a data storage environment. The file system may comprise different methods and data structures designed to read data from and write data to (i.e., store in, retrieve from, or otherwise access) one or more storage devices in the data storage environment. Thus, in the context of data storage environment 200, file system 207-1 defines, for the operating system 206-1, which data blocks belong to (or are otherwise associated with) which files. Operating system 206-2 and file system 207-2 are replicas of operating system 206-1 and file system 207-1, respectively. Thus, during data block (point-in-time copy) restore performed by replica site 202-2, file system 207-2 along with a file system filter in operating system 206-1 provides the awareness necessary to guide the restoration of data blocks and files at the production site 202-1 by the replica site 202-2. This will be further illustrated and explained below in the context of FIG. 3.

The sites 202-1 and 202-2 further comprise, in the example embodiment of FIG. 2, respective virtualization platforms 208-1 and 208-2, each of which may comprise one or more hypervisors. An example of a commercially available virtualization platform that may be used in certain embodiments of the disclosure is the VMware® vSphere™ which may have an associated virtual infrastructure management system such as the VMware® vCenter™. Other types of virtualization platforms that may be used include Microsoft Hyper-V Server.

Still further, in the example embodiment of FIG. 2, the sites 202-1 and 202-2 also comprise respective storage platforms 209-1 and 209-2. These storage platforms may be implemented, for example, using storage products such as VNX and Symmetrix VMAX, both commercially available from Dell EMC Corporation of Hopkinton, Mass. A variety of other products may be utilized to implement at least a portion of the storage platforms 209-1 and 209-2. For example, storage platform functionality may be incorporated within a virtualization platform product.

The protection appliances 204-1 and 204-2, in the example embodiment of FIG. 2, may be implemented at least in part using respective hypervisors of the virtualization platforms 208-1 and 208-2, respectively, and/or the storage platforms 209-1 and 209-2, respectively, of the production and replica sites.

Associated with the production site 202-1 of the example embodiment of FIG. 2 are complex assets 210-1 that illustratively include production virtual machines (VMs) 212 and production storage elements 214. Further, the replica site 202-2 comprises corresponding complex assets 210-2 that include protected virtual machines 216 corresponding to respective ones of the production virtual machines 212 and protected storage elements 218 corresponding to respective ones of the production storage elements 214. These virtual machines 216 and storage elements 218 may typically be referred to as respective "ghost" elements prior to bringing at least a portion of them into a fully operational status in conjunction with recovery of a failure in one of the corresponding complex assets 210-1 of the production site 202-1. Storage elements 214/218 are in the form of storage volumes stored on block devices. Such block devices are where the data blocks are stored at the production site and the replica site.

The protection appliances 204-1 and 204-2, in the example embodiment of FIG. 2, are utilized in configuring the virtual machines 216 and storage elements 218 of the replica site in a manner that facilitates recovery from a failure in one of the complex assets 210-1 of the production site.

Figure 3:
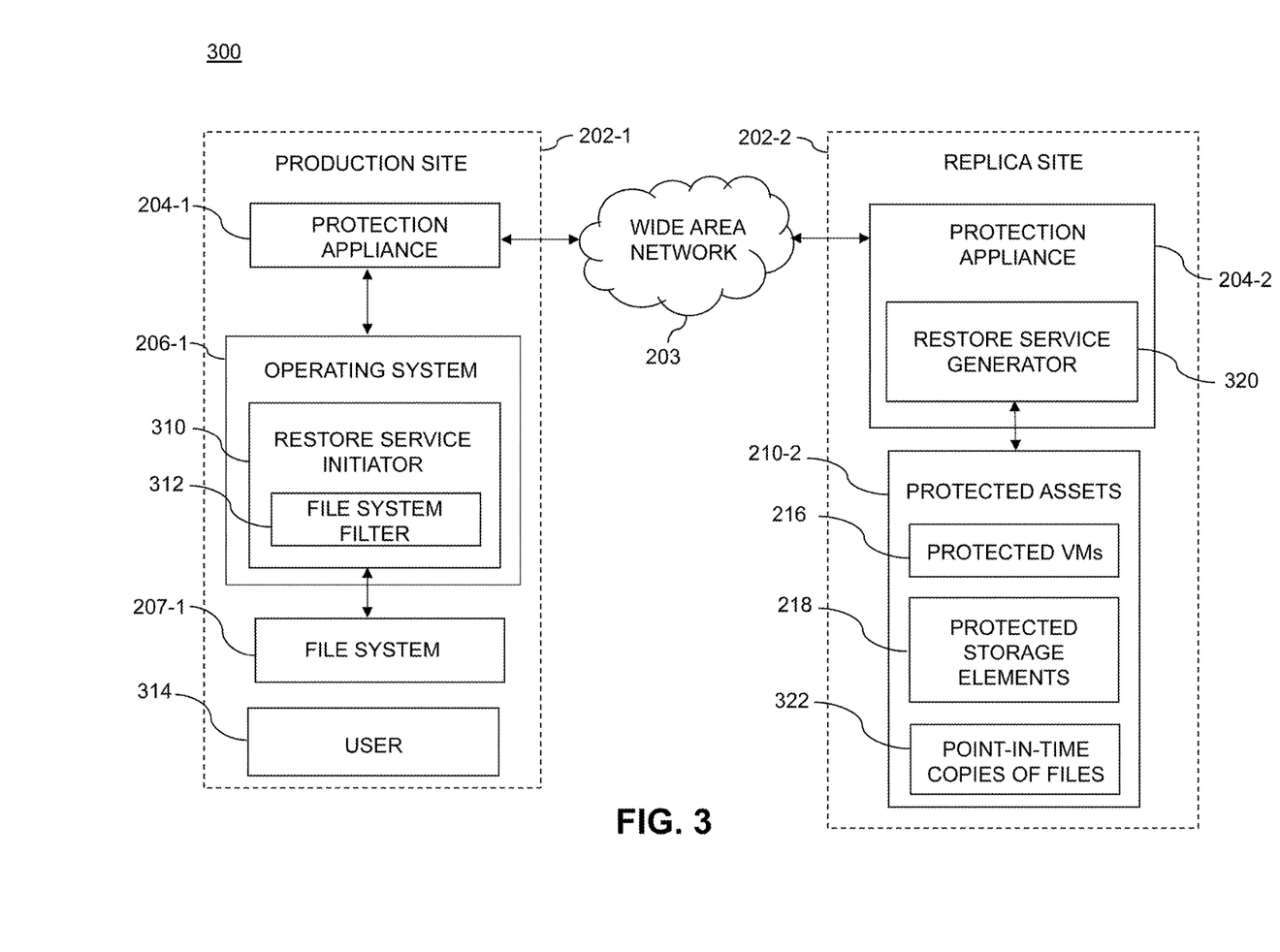
FIG. 3 illustrates details of operating system-protection system integrated restore service functionality within the replication system of FIG. 2.

Turning now to the example embodiment of FIG. 3, details of operating system-protection system integrated restore service functionality 104-1 implemented on data block storage system 102-1 and operating system-protection system integrated restore service functionality 104-2 implemented on data block protection system 102-2 within the replication system of FIG. 2 are shown. The data storage environment 300 in FIG. 3 illustrates a subset of components of the production site 202-1 and replica site 202-2, as well as further components that provide the operating system-protection system integrated restore service functionalities.

As shown, at production site 202-1, operating system 206-1 provides the integrated restore service functionality 104-1 described above. More particularly, the operating system 206-1 comprises a restore service initiator 310 which includes a file system filter 312 (operatively coupled to the file system 207-1). At the replica site 202-2, a restore service generator 320 provides the integrated restore service functionality 104-2.

The restore service initiator 310, in the example embodiment of FIG. 3, generates a request to the replica site 202-2 (through the protection appliances 204-1 and 204-2) to generate a point-in-time copy of files associated with the production site 202-1. The restore service generator 320 generates the requested point-in-time copy of the files, and stores the point-in-time copy in the storage volumes of the protected assets 210-2 as part of point-in-time copies 322.

While replica operating system 206-2 and file system 207-2 are present on the replica site 202-2, the file system filter 312 in the production site 202-1 provides awareness/knowledge to the restore service generator 320 by informing the generator 320 about correlations between the files and the data blocks that belong to these files (e.g., indicates that data blocks 1 through M belong to file 1, data blocks 1 through N belong to file 2, . . . , data blocks 1 through P belong to file Q). In other words, in the example embodiment of FIG. 3, when restore service initiator 310 requests that a point-in-time copy of files be created, the file system filter 312 provides meta-data which instructs the restore service generator 320 on which data blocks correspond to which files in the requested point-in-time copy.

As mentioned above, the files in a point-in-time copy may comprise a set of OS files and a set of data files of the production site 202-1 in certain embodiments. A user 314 (e.g., system administrator or an automated system in certain embodiments) may specify which one or more files in the point-in-time copy are to be restored, e.g., all files in the copy, one or more OS files only, one or more data files only, or some combination thereof. While the user 314 is shown as part of the production site 202-1 in the example embodiment of FIG. 3, the user 314 can alternatively provide input from processing devices located elsewhere in the data storage environment 300 in other embodiments.

In many embodiments, the restore service initiator 310 and the restore service generator 320 may each run on a computer, server or other processing platform element, which may be viewed as an example of what is more generally referred to herein as a "processing device."

Figure 4:
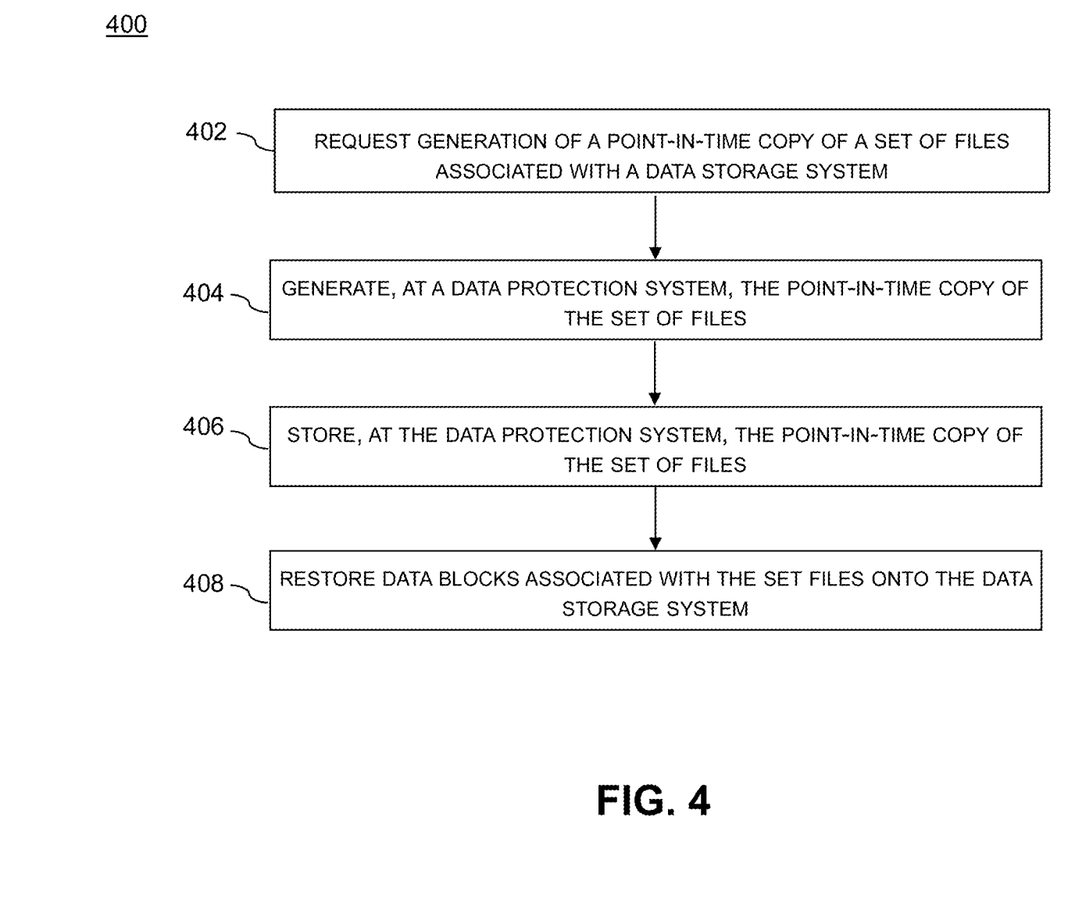
FIG. 4 illustrates a methodology for providing operating system-protection system integrated restore service functionality within a data storage environment, according to an embodiment of the disclosure.

The example embodiment of FIG. 4 illustrates a methodology 400 for providing operating system-protection system integrated restore service functionality within a data storage environment, according to an embodiment of the disclosure. The methodology is summarized in steps 402 through 408. Step 402 requests generation of a point-in-time copy of a set of files associated with a data storage system, wherein the point-in-time copy is useable for restoring data blocks of the set of files onto the data storage system. Step 404 generates, at a data protection system operatively coupled to the data storage system, the point-in-time copy of the set of files, in response to the requesting step. Step 406 stores, at the data protection system, the point-in-time copy of the set of files. Step 408 restores data blocks associated with the set files onto the data storage system from the point-in-time copy stored on the data protection system.

As mentioned previously, at least portions of the data storage environments shown in FIGS. 1-3 may be implemented using one or more processing platforms. Illustrative embodiments of such platforms will now be described in greater detail in conjunction with FIGS. 5 and 6.

Figure 5:
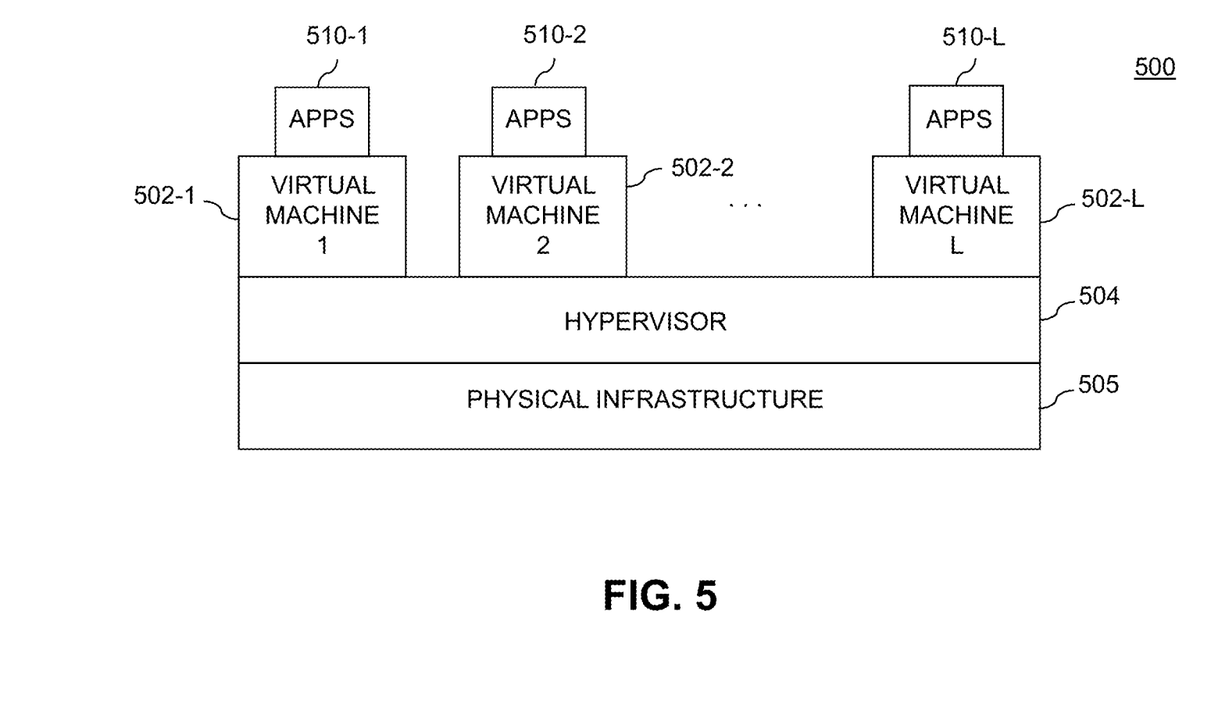
FIGS. 5 and 6 show examples of processing platforms that may be utilized to implement at least a portion of a data storage environment in illustrative embodiments of the disclosure.

The example embodiment of FIG. 5 shows an example processing platform comprising cloud infrastructure 500. The cloud infrastructure 500 comprises a combination of physical and virtual processing resources that may be utilized to implement at least a portion of the data storage environments. The cloud infrastructure 500 comprises virtual machines (VMs) 502-1, 502-2, . . . 502-L implemented using a hypervisor 504. The hypervisor 504 runs on physical infrastructure 505. The cloud infrastructure 500 further comprises sets of applications 510-1, 510-2, . . . 510-L running on respective ones of the virtual machines 502-1, 502-2, . . . 502-L under the control of the hypervisor 504.

These and other types of cloud infrastructure can be used to implement one or more system components, such as restore service initiator 310, file system filter 312, restore service generator 320, other components shown in FIGS. 1-3, and combinations or portions thereof, in a given embodiment.

Although only a single hypervisor 504 is shown in the embodiment of FIG. 5, the data storage environment may of course include multiple hypervisors each providing a set of virtual machines using at least one underlying physical machine. Different sets of virtual machines provided by one or more hypervisors may be utilized in configuring multiple instances of various components of the data storage environment.

An example of a commercially available hypervisor platform that may be used to implement hypervisor 504 and possibly other portions of the data storage environments in one or more embodiments of the disclosure is the VMware® vSphere® which may have an associated virtual infrastructure management system such as the VMware® vCenter™. The underlying physical machines may comprise one or more distributed processing platforms that include one or more storage systems.

In certain embodiments, such storage systems may comprise any of a variety of different types of storage including network-attached storage (NAS), storage area networks (SANs), direct-attached storage (DAS) and distributed DAS, as well as combinations of these and other storage types, including software-defined storage.

In some embodiments, particular types of storage products that can be used in implementing a given storage system in an illustrative embodiment include VNX® and Symmetrix VMAX® storage arrays, software-defined storage products such as ScaleIO™ and ViPR®, flash-based storage arrays such as DSSD™, cloud storage products such as Elastic Cloud Storage (ECS), object-based storage products such as Atmos®, scale-out all-flash storage arrays such as XtremIO™, and scale-out NAS clusters comprising Isilon® platform nodes and associated accelerators in the S-Series, X-Series and NL-Series product lines, all from Dell EMC of Hopkinton, Mass. In many embodiments, combinations of multiple ones of these and other storage products can also be used in implementing a given storage system in an illustrative embodiment.

More specifically, some embodiments can comprise a storage system implemented using DAS configurations comprising local hard drives in respective servers. Such a storage system may additionally or alternatively comprise specialized high-performance flash storage such as DSSD™ accessible via PCIe connections. Numerous other configurations are possible for a given storage system or other related components of the data storage environment.

As is apparent from the above, one or more of the processing modules or other components of the data storage environments shown in FIGS. 1-3 may each run on a computer, server, storage device or other processing platform element. A given such element may be viewed as an example of what is more generally referred to herein as a "processing device." The cloud infrastructure 500 shown in FIG. 5 may represent at least a portion of one processing platform. Another example of such a processing platform is processing platform 600 shown in the example embodiment of FIG. 6.

Figure 6:
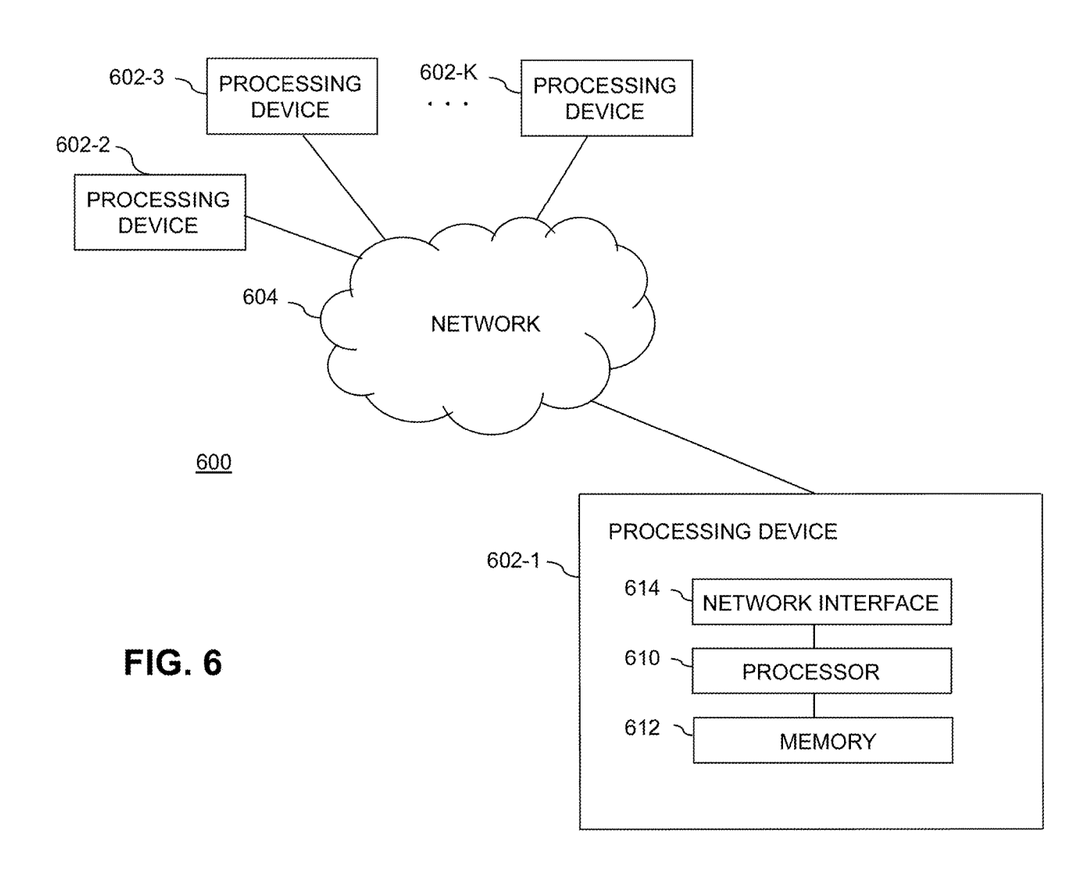

The processing platform 600 in this embodiment comprises a plurality of processing devices, denoted 602-1, 602-2, 602-3, . . . 602-K, which communicate with one another over a network 604.

The network 604 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

As mentioned previously, some networks utilized in a given embodiment may comprise high-speed local networks in which associated processing devices communicate with one another utilizing PCIe cards of those devices, and networking protocols such as InfiniBand, Gigabit Ethernet or Fibre Channel.

The processing device 602-1 in the processing platform 600 comprises a processor 610 coupled to a memory 612.

The processor 610 may comprise a microprocessor, a microcontroller, an application-specific integrated circuit (ASIC), a field-programmable gate array (FPGA) or other type of processing circuitry, as well as portions or combinations of such circuitry elements.

The memory 612 may comprise random access memory (RAM), read-only memory (ROM) or other types of memory, in any combination. The memory 612 and other memories disclosed herein should be viewed as illustrative examples of what are more generally referred to as "processor-readable storage media" storing executable program code of one or more software programs.

Articles of manufacture comprising such processor-readable storage media are considered embodiments of the present disclosure. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 602-1 is network interface circuitry 614, which is used to interface the processing device with the network 604 and other system components, and may comprise conventional transceivers.

The other processing devices 602 of the processing platform 600 are assumed to be configured in a manner similar to that shown for processing device 602-1 in the figure.

Again, these particular processing platforms are presented by way of example only, and other embodiments may include additional or alternative processing platforms, as well as numerous distinct processing platforms in any combination, with each such platform comprising one or more computers, servers, storage devices or other processing devices.

For example, other processing platforms used to implement embodiments of the disclosure can comprise different types of virtualization infrastructure, in place of or in addition to virtualization infrastructure comprising virtual machines. Such virtualization infrastructure illustratively includes container-based virtualization infrastructure configured to provide Docker containers or other types of Linux containers (LXCs).

The containers may be associated with respective tenants of a multi-tenant environment of the data storage environments, although in other embodiments a given tenant can have multiple containers. The containers may be utilized to implement a variety of different types of functionality within the data storage environments. For example, containers can be used to implement respective cloud compute nodes or cloud storage nodes of a cloud computing and storage system. The compute nodes or storage nodes may be associated with respective cloud tenants of a multi-tenant environment. Containers may be used in combination with other virtualization infrastructure such as virtual machines implemented using a hypervisor.

As another example, portions of a given processing platform in some embodiments can comprise converged infrastructure such as VxRail™, VxRack™ or Vblock® converged infrastructure commercially available from VCE, the Virtual Computing Environment Company, now the Converged Platform and Solutions Division of Dell EMC. For example, portions of a value-based governance system of the type disclosed herein can be implemented utilizing converged infrastructure.

It should therefore be understood that in other embodiments different arrangements of additional or alternative elements may be used. In many embodiments, at least a subset of these elements may be collectively implemented on a common processing platform, or each such element may be implemented on a separate processing platform.

Also, in other embodiments, numerous other arrangements of computers, servers, storage devices or other components are possible in the data storage environments. Such components can communicate with other elements of the data storage environments over any type of network or other communication media.

As indicated previously, in some embodiments, components of a data storage environment as disclosed herein can be implemented at least in part in the form of one or more software programs stored in memory and executed by a processor of a processing device. For example, at least portions of a data block restore service controller or other data storage environment components are illustratively implemented in one or more embodiments in the form of software running on a processing platform comprising one or more processing devices.

As mentioned previously, at least portions of the data storage environments in FIGS. 1-3 may be implemented using one or more processing platforms. In some embodiments, a given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one. In many embodiments, logic may be executed across one or more physical or virtual processors. In certain embodiments, a virtual processor may be mapped to and executed on or across a portion of one or more virtual or physical processors.

It should again be emphasized that the above-described embodiments of the disclosure are presented for purposes of illustration only. Many variations and other alternative embodiments may be used. For example, the disclosed techniques are applicable to a wide variety of other types of data storage environments. Also, the particular configurations of system and device elements, associated processing operations and other functionality illustrated in the drawings can be varied in other embodiments. Moreover, the various assumptions made above in the course of describing the illustrative embodiments should also be viewed as exemplary rather than as requirements or limitations of the embodiments. Numerous other alternative embodiments within the scope of the appended claims will be readily apparent to those skilled in the art.

What is claimed is:

1. A method comprising:
    requesting generation of a point-in-time copy of a set of files associated with a data storage system, wherein the point-in-time copy is useable for restoring data blocks of the set of files onto the data storage system;
    generating, at a data protection system operatively coupled to the data storage system, the point-in-time copy of the set of files, in response to the requesting step;
    storing, at the data protection system, the point-in-time copy of the set of files;
    restoring data blocks associated with the set of files onto the data storage system from the point-in-time copy stored on the data protection system; and
    prior to the restoring step, determining whether to restore the entire set of files or a portion of the set of files;
    wherein the restoring step further comprises accessing a file system filter at the operating system of the data storage system to enable the data protection system to determine which data blocks stored thereon correspond to the set of files to be restored;
    wherein the file system filter is further configured to receive at least one request to recover the point-in-time copy of the set of files and to cooperate with a restore service generator of the data protection system to restore the data blocks associated with the set of files on the data storage system;
    wherein the entire of the set of files includes one or more operating system files and one or more data files such that the one or more operating system files and the one or more data files are restored onto the data storage system in accordance with the requesting step; and
    wherein the requesting, generating, storing, and restoring steps are implemented by one or more processing devices each comprising a processor coupled to a memory.

2. The method of claim 1, wherein the file system filter maintains a placeholder file to provide access from the data storage system to data blocks of the set of files stored at the data protection system.

3. The method of claim 1, wherein the data storage system comprises a block device storage system and the data protection system comprises a block device protection system.

4. The method of claim 1, wherein the data protection system comprises one of a replication system and a backup system.

5. A computer program product comprising a non-transitory processor-readable storage medium having stored therein program code of one or more software programs, wherein the program code when executed by one or more processing devices causes the one or more processing devices to:
    request generation of a point-in-time copy of a set of files associated with a data storage system, wherein the point-in-time copy is useable for restoring data blocks of the set of files onto the data storage system;
    generate, at a data protection system operatively coupled to the data storage system, the point-in-time copy of the set of files, in response to the requesting step;
    store, at the data protection system, the point-in-time copy of the set of files;
    restore data blocks associated with the set of files onto the data storage system from the point-in-time copy stored on the data protection system by accessing a file system filter at the operating system of the data storage system to enable the data protection system to determine which data blocks stored thereon correspond to the set of files to be restored; and
    prior to restore, determine whether to restore the entire set of files or a portion of the set of files;
    wherein the file system filter is further configured to receive at least one request to recover the point-in-time copy of the set of files and to cooperate with a restore service generator of the data protection system to restore the data blocks associated with the set of files on the data storage system; and
    wherein the entire of the set of files includes one or more operating system files and one or more data files such that the one or more operating system files and the one or more data files are restored onto the data storage system in accordance with the request to generate.

6. An apparatus comprising:
    one or more processing devices configured to:
    request generation of a point-in-time copy of a set of files associated with a data storage system, wherein the point-in-time copy is useable for restoring data blocks of the set of files onto the data storage system;
    generate, at a data protection system operatively coupled to the data storage system, the point-in-time copy of the set of files, in response to the requesting step;
    store, at the data protection system, the point-in-time copy of the set of files;
    restore data blocks associated with the set of files onto the data storage system from the point-in-time copy stored on the data protection system;
    access a file system filter at the operating system of the data storage system to enable the data protection system to determine which data blocks stored thereon correspond to the set of files to be restored; and
    prior to restore, determine whether to restore the entire set of files or a portion of the set of files;

wherein the file system filter is further configured to receive at least one request to recover the point-in-time copy of the set of files and to cooperate with a restore service generator of the data protection system to restore the data blocks associated with the set of files on the data storage system; and wherein the entire of the set of files includes one or more operating system files and one or more data files such that the one or more operating system files and the one or more data files are restored onto the data storage system in accordance with the request of generation of the point-in-time copy.

7. The apparatus of claim 6, wherein the file system filter maintains a placeholder file to provide access from the data storage system to data blocks of the set of files stored at the data protection system.

8. The apparatus of claim 6, wherein the data protection system comprises one of a replication system and a backup system.

9. The method of claim 1, wherein with respect to the data protection system and the data storage system, the point-in-time copy of the set of files are stored only on the data protection system.

10. The computer program product of claim 5, wherein with respect to the data protection system and the data storage system, the point-in-time copy of the set of files are stored only on the data protection system.

11. The computer program product of claim 5, wherein the file system filter is configured to maintain a placeholder file to provide access from the data storage system to data blocks of the set of files stored at the data protection system.

12. The apparatus of claim 6, wherein with respect to the data protection system and the data storage system, the point-in-time copy of the set of files are stored only on the data protection system.

13. The method of claim 1, wherein the entire of the set of files is stored only on the data protection system.

14. The computer program product of claim 5, wherein the entire of the set of files comprises one or more operating system files and one or more data files, and wherein the entire of the set of files is stored only on the data protection system.

15. The apparatus of claim 6, wherein the entire of the set of files comprises one or more operating system files and one or more data files, and wherein the entire of the set of files is stored only on the data protection system.

16. The computer program product of claim 5, wherein the data storage system comprises a block device storage system and the data protection system comprises a block device protection system.

17. The computer program product of claim 5, wherein the data protection system comprises one of a replication system and a backup system.

18. The method of claim 1, wherein the requesting generation step is performed by a restore service initiator and the generating step is performed by a restore service generator.

19. The computer program product of claim 5, wherein the program code is configured to:
request generation of the point-in-time copy with a restore service initiator; and
generate the point in time copy with a restore service generator.

20. The apparatus of claim 6, wherein the one or more processors are configured to:
request generation of the point-in-time copy with a restore service initiator; and
generate the point in time copy with a restore service generator.

* * * * *